Sept. 14, 1965   H. FUNCK   3,205,536
INJECTION MOLDING MACHINE WITH PIVOTAL NOZZLE
AND PLURAL STATIONARY MOLDS
Filed July 26, 1962   3 Sheets-Sheet 2
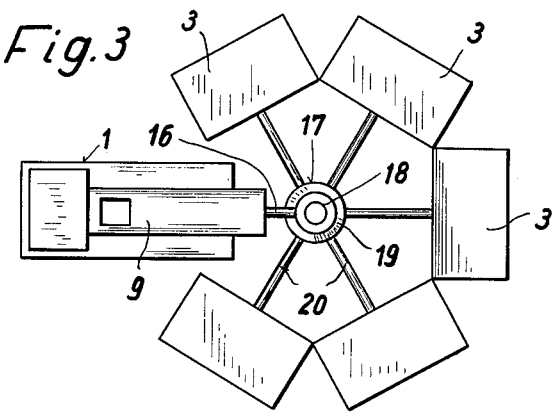
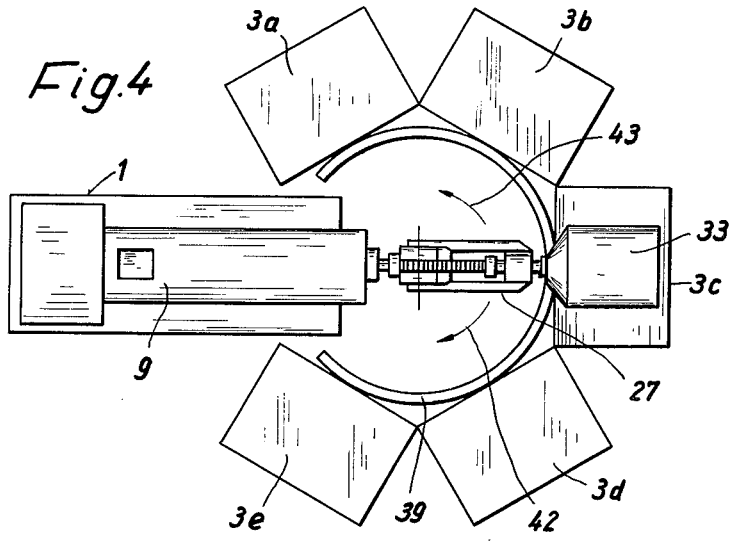

Sept. 14, 1965  H. FUNCK  3,205,536
INJECTION MOLDING MACHINE WITH PIVOTAL NOZZLE
AND PLURAL STATIONARY MOLDS
Filed July 26, 1962  3 Sheets-Sheet 3
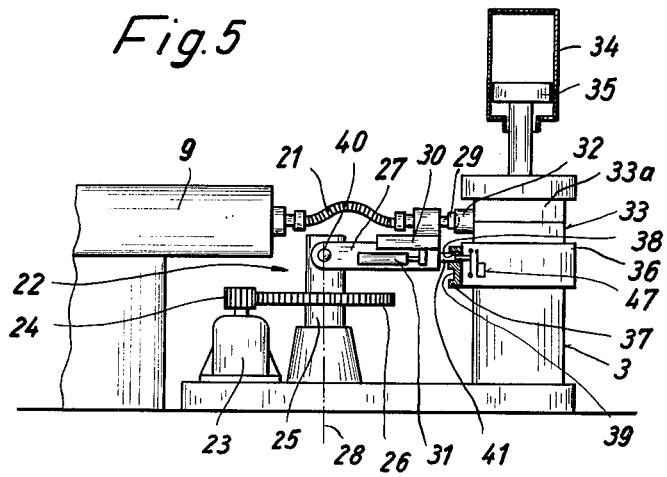
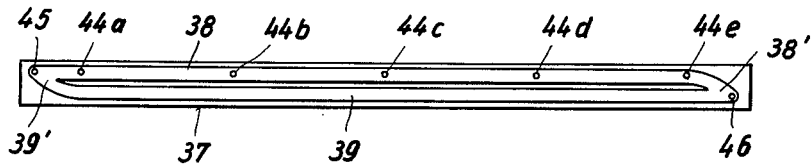

United States Patent Office 3,205,536
Patented Sept. 14, 1965

3,205,536
INJECTION MOLDING MACHINE WITH PIVOTAL NOZZLE AND PLURAL STATIONARY MOLDS
Herbert Funck, am Wasserbogen 43, Lochham, near Munich, Germany
Filed July 26, 1962, Ser. No. 212,525
Claims priority, application Germany, July 31, 1961, F 34,580
8 Claims. (Cl. 18—30)

The invention relates to an injection molding machine for making moldings of thermoplastic materials comprising several mold holders arranged in an annulus and each receiving an injection mold, a plasticizing chamber, and apparatus for successively injecting synthetic resin, forced from this chamber, into the molds.

Most hitherto known injection molding machines have mold holders which are angularly spaced about the axis of the mold holder ring on a rotatable and in certain circumstances also laterally displaceable carrier so that the injection orifices of the molds are on the outer periphery of the annulus, and the plasticizing chamber is stationary outside the annulus of mold holders. By intermittently rotating the carrier of the injection mold holders, the injection molds mounted in these holders are successively placed with their injection orifices opposite an injection head, combined with the plasticizing chamber to form an oblong injection unit, injecting the plastic into the molds. This unit is located radially to the mold holder annulus so that the entire machine is comparatively long.

There are also known arrangements in which the plasticizing chamber and the head are located outside the ring of mold holders on a stand so that the axis of the injection unit comprising the plunger and plasticizing chamber and the head, is parallel to the axis of rotation of the rotatable carrier and vertically above the annulus of injection mold holders, and the molds are placed successively with their upwardly facing orifices under the nozzle.

With all known injection molding machines for thermoplastics, the molds are moved relative to the stationary plasticizing chamber.

In order to increase the production rate of these machines, the output of the plasticizing chamber—which may have a screw instead of a plunger—has been raised, and the mold holders have been equipped with substantially automatic devices for cooling and opening the molds, ejecting the moldings, and closing the molds. Since the molds must be kept closed for a certain time after receiving the charge and must remain under pressure during the cooling, followed by the removal of the molding, the number of molds had to be increased in order to make full use of the higher output.

The extensive mechanization of these devices provided on the individual mold holders requires an increase in technical expenditure. The devices, necessary for controlling these mechanisms, make the construction of the mold holder annulus very complicated. When an injection unit is provided on the outer periphery of the ring, this outer periphery must be free so that the injection head of the press may be placed opposite the injection orifices of the molds and so that this relative movement is not obstructed by the operational and control devices. The arrangement of these devices on the inside or on one free end face of the mold holder ring makes the arrangement inaccessible and inspection and maintenance is very difficult. Similar difficulties are encountered in the application of the operating means, such as compressed air or hydraulic oil, in the supply of the molds with coolant, necessary for the quick cooling of the molding, and in the quick emptying of the molds.

The present invention has the object of eliminating these difficulties and disadvantages of known injection molding machines with a ring-shaped injection mold arrangement. It has the further object or reducing those parts of the masses of the injection molding machine that have to be intermittently moved, and thus reducing the effort needed for the quick accelerations and decelerations of these masses. Finally also, the invention aims at simplifying the inspection and maintenance of the operating and control devices of the molds and of the removal and replacement of the molds in order to produce different products.

The invention comprises substantially a new and improved injection molding machine for manufacturing moldings of thermoplastic materials, in which, contrary to hitherto known machines, the mold holders are arranged in an annulus and are stationary, the injection orifices of the molds to be fitted into the holders face towards the inside of the annulus, and the arrangement for introducing the plasticized synthetic resin issuing from the plasticizing chamber into the molds is located within the annulus of mold holders and movable relative thereto.

The mobility of the means for injecting the plastic into the molds may be effected in that way that an injection unit, comprising a plasticizing chamber and the injection nozzle, is located inside the mold holder annulus and is rotatable about the axis of this annulus. However, the plasticizing chamber, forming the heavier part of the injection unit, may also be stationary, and only a distributor, carrying the synthetic resin to the molds such as, e.g., a pressure hose, may be pivotable or rotatable, and may form a connection successively between the plasticizing chamber and the individual molds.

Further features and advantages of the invention will become apparent from the following description, with reference to the accompanying drawings, in which:

FIG. 3 is a top view of an injection molding machine according to the invention with centre distributor and connecting duct between distributor and molds;

FIG. 4 is a top view of another embodiment of the machine, in which the distributor is a movable duct;

FIG. 5 is a side elevation of a machine similar to FIG. 4, in which the distributor duct is a flexible pressure hose;

FIG. 6 shows a developed cam profile serving as guide for the pressure hose of the machine of FIG. 5.

Figure 1:
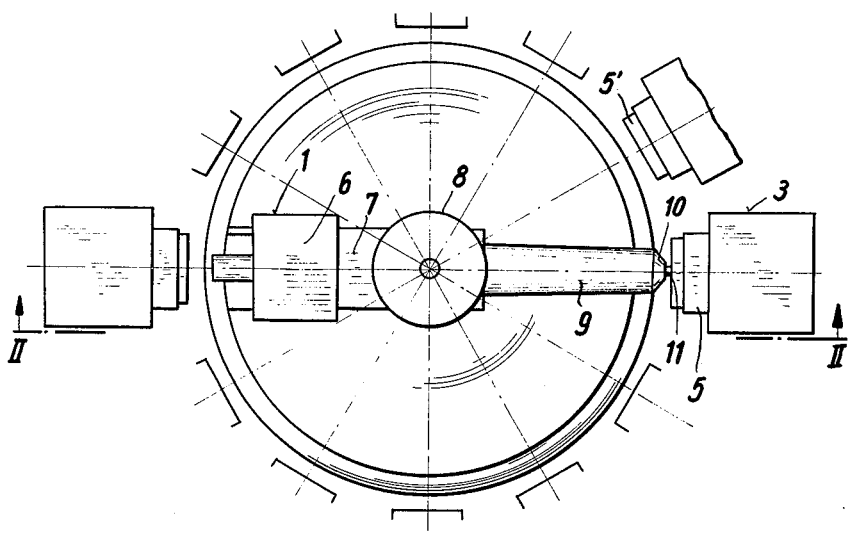
FIG. 1 is a top view of a first embodiment of the machine according to the invention.
Figure 2:
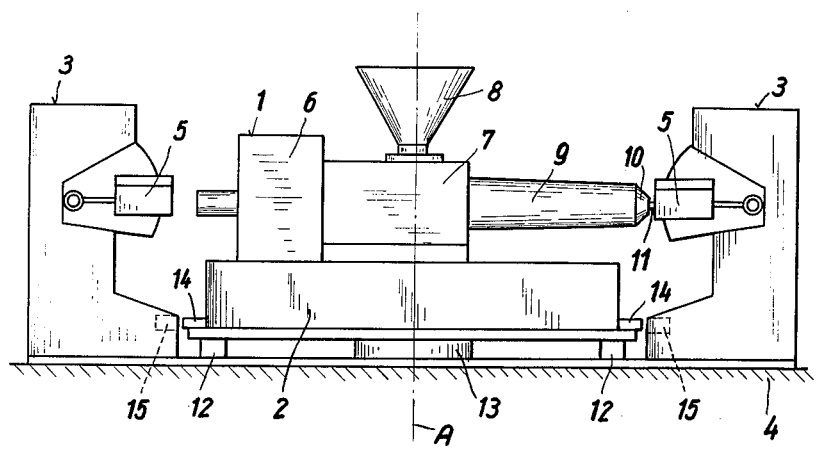
FIG. 2 is a cross-section along the line II—II in FIG. 1.

The injection molding machine of FIGS. 1 and 2 comprises an injection unit 1 supplied with synthetic resin raw materials and mounted on a rotatable base 2, say, twelve injection mold holders 3, equidistantly spaced about the rotating base 2 and located in a ring about the axis A of the base 2; the holders are stationary on a fixed base plate 4. The injection molds 5 to be fitted into the holders 3 are all at the same level and form a ring. Their injection orifices face towards the inside of the ring and are located on a circle. The injection unit 1 consists of the driving section 6, the charging part 7 with a feed hopper 8 for the material to be processed, and the plasticizing chamber 9 equipped with a screw. The end of the chamber carries an injection head 10 from which the plasticized material flows to the molds.

The injection head 10 has an injection nozzle 11 displaceable axially with respect, to the chamber 9, i.e. radially with respect to the mold ring; the nozzle can be pressed firmly against an injection orifice in the angular positions of the injection unit, in which the head 10 is opposite the orifice of am old. The upper orifice of the conical hopper 8 is so large that the raw materials will always drop into the feed hopper even when the injection unit is longitudinally moved.

The rotatable base 2 is mounted on rollers 12 and guided by a central pivot 13. The rotatable base 2 of the injection unit 1 is equipped with control members 14 which act on actuators 15 located in the base of the mold holder 3 and control the operating devices (not shown), for closing, cooling, opening and emptying the molds 5, which devices are located within the mold holders 3.

The operation of the injection molding machine is as follows:

The raw material introduced into the hopper 8 is kneaded in the plasticizing chamber 9 by the screw (not shown) plasticized and pressurized, so that it can be pressed through the head 10 and its nozzle 11 under pressure into a mold 5. When the mold has been filled, the nozzle 11 is retracted, the whole injection unit with the head 10 and the nozzle 11 is rotated through an angle of 30° so that the head 10 is opposite the injection orifice of the next mold. Then the nozzle 11 is advanced and the next mold 5' is charged. This is repeated in quick sequence.

During the intermittent rotation of injection unit 1, the control members 14 mounted on the periphery of the rotatable base 2 are brought within the range of the actuators 15 and operate the actuating mechanisms for opening and emptying and closing molds 5, in such a way that the opening, emptying and closing process is effected immediately prior to the filling of the next mold by the injection unit.

The operation of the rotary and feed movement of the injection unit 1 and of the opening and emptying and closing mechanisms of the molds is effected hydraulically as known to the art. In addition, the molds 5 are also water-cooled. The control of the cooling water circuit is also effected by the control members 14.

The members of the hydraulic control of the injection unit may be mounted in the rotating base 2 so that only the current for the hydraulic pump drive and for the hydraulic controls is supplied through the central journal 13.

The advantages of a stationary arrangement of the mold holder, compared with the conventional arrangement with rotating mold ring and stationary injection unit, in which the molds are intermittently brought opposite the injection unit, are as follows:

With a larger number of molds, the weight of the injection unit is smaller than that of the mold holder support, so that the effort for the intermittent acceleration and deceleration of the injection unit is smaller than that required for the larger mass of the entire mold holder assembly with the molds.

The control of the mechanisms for closing and opening the molds and ejecting the finished molding may be considerably simplified.

Both a change of a mold and maintenance of individual molds and holders may be effected during the operation of the machine without obstructing the use of the other molds.

According to the present invention, the machine of FIGS. 1 and 2 may be further simplified and the weight of the parts to be moved intermittently may be further reduced.

This improvement is based on the fact that heated thermoplastics leaving the plasticizing chamber behave like highly viscous liquids and it is possible to inject these hot masses, by means of the pressure produced in the stationary plasticizing chamber by a plunger or screw, through a movable injection system.

According to this principle, the main part of the injection unit consisting substantially of the plasticizing chamber, is stationary and only a distributing member carrying the material to the molds is moved within the annulus and preferably rotated about its axis.

A distributor of this kind may be comparatively light, that is, of low inertia. The heavy parts of the injection unit, such as the plasticizing chamber, the screw, the drive, and the hopper do not rotate about the axis of the ring of molds and are easily accessible during the operation. The entire construction is compact.

The masses to be accelerated and decelerated from one mold to the next, are smallest if the stationary main part of the injection unit is connected to a distributor located at least substantially in the center of the mold ring, and having a rotatable distribuing member by which channels leading from the distributor to individual molds are successively connected to the main part of the injection unit.

In this embodiment of the injection molding machine, for example, only a distributing member formed by a rotary slide is rotated intermittently, in order to connect the individual molds successively with the main part of the injection unit.

This distribution of the material through several ducts each connected to a respective mold has, however, certain disadvantages, because some thermoplastic materials must remain hot in order to maintain their viscous condition; if the material is now stationary in the ducts for one operating cycle, that is, until the same mold is filled again, the material must be kept hot, and may possibly have to be heated additionally; with temperature sensitive materials this may easily lead to undesirable decomposition and discoloration phenomena.

This difficulty may be overcome in that the moving distributing member is a duct connected to the main part of the injection unit, and making contact by means of a mounting pivotable about the axis of the mold ring through its injection nozzle successively with the injection orifices of the molds. Since in this single channel the plastic material remains stationary only during the short period of transition from one mold to the next, these decomposition and discolouration phenomena can no longer occur.

In a preferred embodiment, this duct for leading the hot injection material into the molds is a flexible pressure hose avoiding any movable seals, such as stuffing boxes, slides and the like. The plastic material flows easily, without obstruction, sharp bends or dead corners.

This flexible pressure hose must have an inner coating of heat resistant elastic material, such as polytetrafluoroethylene or silicon rubber.

In order to avoid undesirable cooling of the plastic material within the distributor, the ducts or channels are thermally insulated and, if necessary, additionally heated.

In the machine of FIG. 3, the main part of the injection unit, formed, for example, by a screw press, is stationary. The plasticizing chamber 9 of the injection unit 1 communicates with the distributor 17 through a pressure pipe 16, having an inner rotary slide valve 18 and an outer distributor housing 19, whose radial orifices are firmly connected with individual channels 20 leading to the individual injection molds in the stationary holders 3.

The injection unit 1 is located in a gap of the mold ring, formed by the mold holder 3. The distributor 17 and its rotary slide valve 18 are in the centre.

During the operation of this injection molding machine, the rotary slide valve 18 of the distributor 17 successively connects the individual injection molds with a pressure pipe 16 of the plasticizing chamber 9 and causes these molds to be filled successively.

The individual molds are opened, emptied and closed during the period required by the rotary slide for one complete intermittent rotation.

It may be seen that in this embodiment plastic material remains stationary in the ducts 20 for one operating cycle. In order to maintain its plasticity, this mass must be kept hot by insulation or additional heating which may lead to undesirable changes, and especially to discolouration.

This drawback is avoided by the embodiment of FIGS. 4 and 5, in that there is connected to the plasticizing chamber 9 of the injection unit 1 a pivoting distributing member in the form of a single duct, and particularly a flexible pressure hose 21, held and guided by a rotatable support 22. The rotatable mounting 22 is associated with a motor 23, driving through a pinion 24 a gear 26 mounted on the rotatable mounting 25, and intermittently rotating a mounting arm 27 about the axis 28 located in the center of the injection mold holder ring 3a–3e. The end of the mounting arm 27 carries the injection nozzle 29 located at the end of the hose 21 and supported on a slide 30 displaceable on the arm 27. A feed mechanism 31 urges the nozzle 29 against the force of a return spring (not shown) into the injection orifice 32 of a mold 33. The mold 33 is opened and closed by an operating cylinder 34 carrying a piston 35, connected with the upper part 33a of the mold 33.

On the inside of the tables 36 of the mold holders 3, there is a guide 37 for the mounting arm 27, extending as an arcuate rail along all mold holders 3, and having an upper guide groove 38 and a lower guide groove 39 (see FIG. 6). These grooves are joined at acute angles at the ends. The mounting arm 27 is pivotable about horizontal pivot means 40. A guide pin 41 is provided on the outer end of the arm 27. While the guide pin 41 is moving in the upper guide groove 38, the nozzle 29 is always opposite the orifices 32 of the individual molds 33; after the termination of one pivoting movement in the direction of the arrow 42 (FIG. 4) the pin 41 enters the sloping portion 38' of the upper groove 38, so that the mounting arm 27 with the hose 21 and the nozzle 29 are moved downward. The return movement in the direction of the arrow 43 is then effected without interruption, the pin 41 being now in the lower guide groove 39. At the end of the groove 39, the sloping section 39' returns the pin 41 to the upper groove 38 (FIG. 6). In the groove 38, there are pressure members 44a to 44e, operated by guide pin 41, and at the ends of the groove there are further pressure members 45 and 46 displaced by the guide pin and operating control contacts 47 for controlling the pivoting movement of the counting 22, the injection and the continuation of the pivoting movement or its reversal. The pressure members 44a–44e are located at the points at which the guide pin 41 is located with the injection nozzle exactly opposite a mold orifice 32.

The operation of the machine is as follows:

After the return movement of the guide pin 41 to the left part 39' of the lower guide 39, actuation of the pressure member 45 and the associated contacts 47, the motor 23 is reversed, causing the guide pin 41 to travel in the upper guide groove 38 to the right. When the pressure member 44a is reached, the guide pin 41 causes the motor 23 to stop in the position in which the nozzle 29 is opposite the orifice of the mold in the carrier 3a. Simultaneously, the feed mechanism 31 (FIG. 5) is operated, forcing the nozzle 29 against the force of its return spring firmly into the orifice 32 of the mold, in which the nozzle is centered.

Immediately thereafter, liquid plastic material is injected into the mold through the flexible heat-insulated pressure hose 21. When the mold is filled, the feed mechanism 31 is switched off, and the nozzle is returned to its original position by its spring. The motor 23 advances the mounting 22 in the direction of the arrow 42, until the guide pin 41 actuates the next pressure member 44, associated with the mold in the carrier 3b. The subsequent operations are as described above. In this manner, the molds are successively filled. During the continued movement after filling the last mold in the carrier 3e, the guide pin 41 reaches the sloping part 38' of the guide 38, actuating the member 46 which actuates in turn an associated contact causing the motor 23 to be reversed so that the mounting 22 with its guide pin 41 is now pivoted in the direction of the arrow 43 in FIG. 4 to the other end of the guide track. During this movement, the injection nozzle 29 moves freely under the mold injection orifices 32. When the pressure member 45 at the end of the sloping part 39' of the guide 39 is reached, the motor 23 is stopped and reversed, and the entire cycle of filling the cooled, emptied and closed molds starts again. The sloping ends 38', 39' of the guides 38 and 39 have switch guides known to the art, and not shown, forcing the guide pin 41 to pass through the guides as described hereinbefore.

As shown in the drawings, the embodiment of the machine of FIGS. 4 to 6 results in a very compact construction, in which nevertheless both the stationary mold holders and molds, and the stationary press are easily accessible. The control of the entire assembly is effected substantially by stationary contacts or devices, and only the feed mechanism 31 for the nozzle 29 is located in a movable member.

Since the injection nozzle 29 can be advanced and retracted by the feed mechanism 31, it is also possible to effect the return of the mounting 22 and its guide pin 41 without using the lower guide groove 39, which can then be dispensed with. In this case, a control member for initiating the return movement is provided at the end of the single guide groove 38; this member controls the retraction of the nozzle which, upon retraction, is brought out of the range of the injection orifices and is then moved continuously to the other end of the groove without stopping, and the stepwise movement of the injection nozzle begins again from this other end.

What I claim is:

1. An injection molding machine for plasticized material, including a plurality of mold holders, said holders being stationary and substantially defining the circumference of a ring, a plurality of molds for said holders, the injection orifices of said molds facing the interior of said ring, and injection means, including a first part having a least a plasticizing chamber and a second part comprising an apparatus for introducing the plasticized material from said first part into said molds, at least said apparatus being located interior of said ring, and said apparatus including a device movable in an arc about a fixed point located substantially at the center of said ring for filling the molds, and said apparatus further including a single feed channel having a first end located substantially centrally of said ring and fed with plasticized material, and a second end connected to said device, said device being a retractable injection nozzle for sequentially engaging said injection orifices, and means for mounting said channel to pivot at its said first end.

2. The injection molding machine of claim 1, wherein said first part of the injection means includes also drive means and feed means.

3. The injection molding machine of claim 1, wherein said channel is flexible and pivots in a substantially horizontal plane.

4. The injection molding machine of claim 1, wherein the said first part of the injection means extends from a gap in said ring towards the center of said ring; guide means associated with said ring; and engaging means associated with said channel for engaging said guide means and guiding said channel and injection nozzle in a first direction for feeding said injection orifices and in a second return direction.

5. The injection molding machine of claim 4, wherein said guide means comprises first and second parallel track means in a substantially vertically spaced arrangement and connected together to form an endless path, said first and second track means guiding said engaging means for movement in said first and second directions respectively, whereby said injection nozzle is caused to move at the level of said injection orifices in said first direction and to move at a different level in said second direction.

6. The injection molding machine of claim 5, wherein control means, one for each mold, are associated with said guide means actuated by said engaging means as the latter moves therein, said control means controlling the movement of said channel and injection nozzle in said first and second directions and the injection of plasticized material into the molds.

7. The injection molding machine of claim 4, in which said guide means comprises a single track means, and which includes means actuated by said engaging means for retracting said injection nozzle when the latter moves in said second direction.

8. The injection molding machine of claim 7, wherein control means, one for each mold, are associated with said guide means and actuated by said engaging means as the latter moves therein, said control means controlling the movement of said channel and injection nozzle in said first and second directions and the injection of plasticized material into the molds.

References Cited by the Examiner

UNITED STATES PATENTS

| 2,514,486 | 7/50 | Green | 18—30 |
| 3,014,243 | 12/61 | Hehl | 18—30 |

FOREIGN PATENTS 839,015  6/60  Great Britain.

WILLIAM J. STEPHENSON, *Primary Examiner.*
ROBERT F. WHITE, MICHAEL V. BRINDISI,
*Examiners.*